July 3, 1962

A. BOEKHORST 3,042,879

CONTROLLABLE OSCILLATOR

Filed April 2, 1958

INVENTOR
ANTONIUS BOEKHORST

BY
AGENT

United States Patent Office 3,042,879
Patented July 3, 1962

3,042,879
CONTROLLABLE OSCILLATOR
Antonius Boekhorst, Eindhoven, Netherlands, assignor to North American Philips Company, Inc., New York, N.Y., a corporation of Delaware
Filed Apr. 2, 1958, Ser. No. 725,999
Claims priority, application Netherlands Apr. 25, 1957
10 Claims. (Cl. 331—20)

The present invention relates to controllable oscillators of the blocking type for producing pulsatory or saw-tooth voltages, comprising a multi-grid valve, an L.C.-circuit, through which the first and the second grid are electrically coupled together, intended for producing sinusoidal oscillations, an anode circuit for taking off the pulsatory or saw-tooth voltages and a blocking circuit.

Such oscillators may be employed in television receivers for producing the saw-tooth or pulsatory voltages used for controlling the line time base or the picture time base. Generators of this type usually employ direct synchronization, since the synchronization signal is applied inductively or capacitatively to the grid of the oscillator valve.

If, however, fly-wheel synchronization is to be used, with the resultant advantages, this method cannot be adopted.

The oscillator according to the invention permits this method to be used and has the feature that the blocking circuit is made up of a capacitor and a resistor, the capacitor being connected between the first grid and the L.C.-circuit, while the resistor is connected between the first grid and a source of direct voltage which is variable so as to vary the frequency of the generator.

In order that the invention may be readily carried into effect, one form of an oscillator according to the accompanying drawing, in which.

Figure 1:
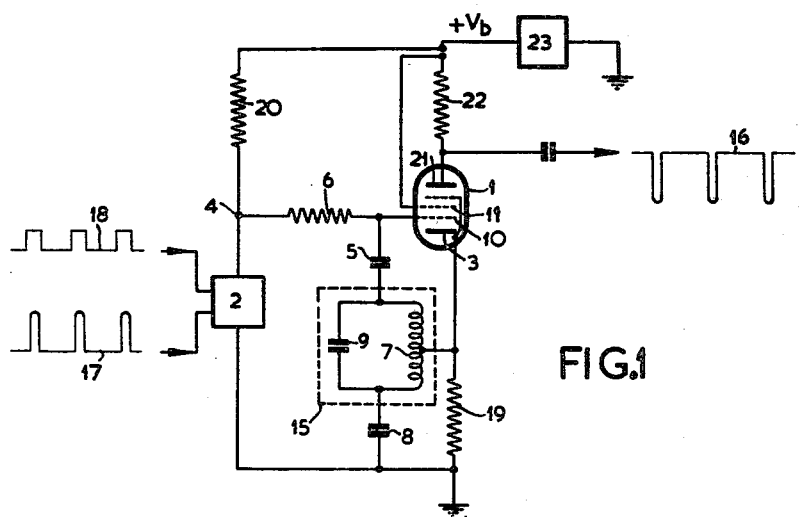
FIG. 1 is a schematic circuit diagram showing an electric wave oscillator.

In FIG. 1, the grid circuit of the first grid of the valve 1 comprises a network made up of a coil 7 and a capacitor 9, which network along with a grid 10, a grid 11 and a cathode 3 seeks to produce a sinusoidal voltage which is applied to the grid 10 through a capacitor 5. The selfinductance value of the coil 7 and the capacitance value of the capacitor 9 are chosen such that this selfinductance-capacitance circuit is substantially tuned to the line frequency. The cathode circuit of the valve 1 comprises a resistor 19, by which the cathode 3 is brought to a positive potential $V_{k3}$, and a capacitor 8 having a high value and acting as a decoupling capacitor. An anode 21 is connected through a resistor 22 to the voltage source 23 supplying a direct voltage $V_b+$. The grid 11 is also connected to this voltage source and, since this source has a very low impedance with regard to alternating current, the grid 11 may be thought of as being connected to earth with respect to the alternating current.

Figure 2:
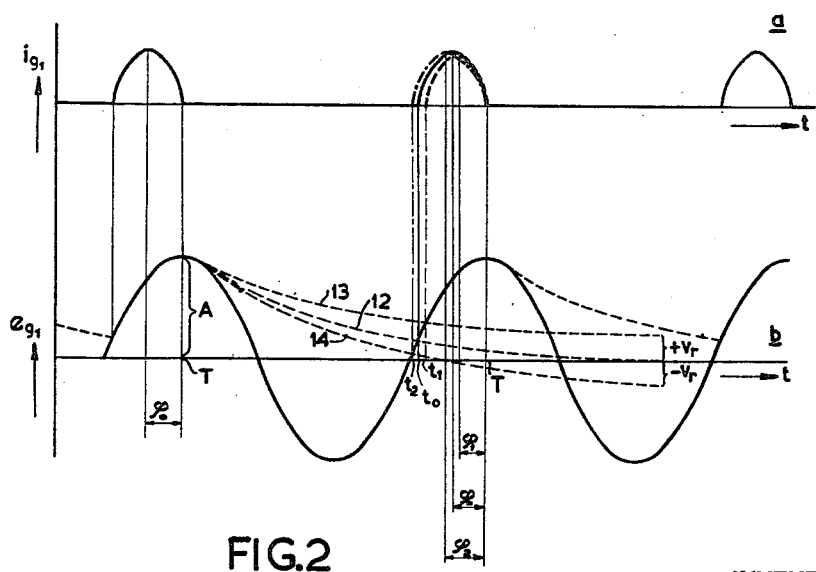
FIGS. 2 and 3 are curves referred to in the description of operation of the circuit of FIG. 1.

Assuming the potential difference between the potential at 4 ($V_4$), for example being the output voltage of a phase detector 2 to which are supplied a synchronization signal 18 and a voltage 17 derived from the oscillator wave, and the potential of the cathode 3 ($V_{k3}$) to be zero ($V_4-V_{k3}=0$), then the sinusoidal voltage $e_{g1}$, illustrated in FIG. 2b, will tend to drive the grid 10 positive and the capacitor 5 will be charged to the value A by the then flowing grid current $i_{g1}$. The electrode of the capacitor 5, which is connected to the grid 10, is then driven negative with regard to the cathode potential, hence the anode current of the valve 1 and the grid current to the grid 10 are suppressed and the tuned circuit 15 will tend to decay substantially at its natural frequency. The charge of the capacitor 5 on said electrode is now allowed to leak off through the resistor 6 so that the potential of said electrode tends to assume the same value as that of the other electrode.

The condition postulated above is regarded as the synchronous state, that is to say the state in which the phase difference between the synchronization signal 18 fed to the phase detector 2, and an oscillation taken from the valve 1 or an oscillation 17 derived from the former, which is also fed back to the phase detector 2, in such that the output voltage of the phase detector 2 corresponds to the cathode potential. This state of equal potential will persist as a result of the large capacitor 8, even after suppressing the cathode current.

In order for said equal potential to persist even in the case of any voltage variations, other than as a result of departure of the generator frequency from the synchronization frequency, for example of the supply voltage, provision is made of a resistor 20 of the voltage-dependent type, resulting in that the voltage at 4 varies similarly to the voltage across the resistor 19.

The RC-time of the capacitor 5 and the resistor 6 is required to be short relative to the cycle of the sinusoidal voltage, hence the discharge curve $$V_{c5}=Ae^{-\frac{t}{R_6C_5}}$$

varies as illustrated by the curve 12 shown in FIG. 2b.

From FIG. 2b it is seen that this curve 12 starts from the peak A of the sine curve. Actually, A is positive while the voltage on the grid 10 is driven negative relative to the cathode. For an easy view, however, the polarity has not been allowed for in the drawing in order for the instant $t_0$ directly to be determined, that is to say the intersection of the curve 12 and the sine curve. This is the instant at which the sine voltage increasing in a positive direction and the negative, decreasing capacitor voltage become equal to each other and grid current tends to flow again. This grid current will continue to flow till the instant T at which the grid current and the anode current are again suppressed; thus the aforesaid operation is repeated.

It will be appreciated that, if the control voltage $V_4=V_{k3}$, a grid current $i_{g1}$, illustrated in FIG. 2a then occurring will lag relative to the sine voltage. The angle of lag is shown in FIG. 2b and is $-\varphi_0$ in this state.

Figure 3:
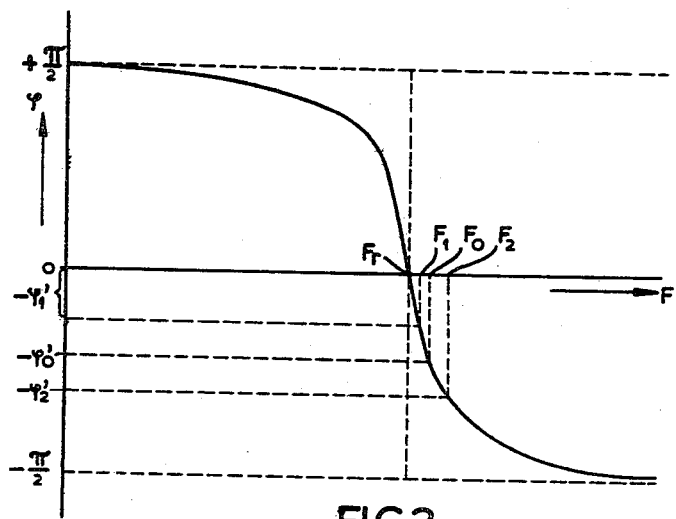

FIG. 3 shows a possible phase characteristic of the circuit 15 as a function of the frequency. If the phase difference between the current through the circuit and the voltage across the circuit is zero, the associated frequency $F_r$ corresponds to the resonance frequency of the circuit. If, for example, this phase difference is $-\varphi'_0$, the frequency is $F_0$, the then occurring phase difference between the grid current $i_{g1}$ and the voltage across the circuit 15 then being $-\varphi_0$. It is to be noted that the current $i_{g2}$ to the grid 11 and the anode current $i_a$ will substantially have the same form as the grid current $i_{g1}$. Owing to the influence of $i_{g2}$ on the grid voltage, the phase difference $-\varphi_0$ will not exactly correspond to $-\varphi'_0$ but approximately $-\varphi_0 \approx -\varphi'_0$ so that in this case the angles shown in FIG. 2b may be taken for granted and the free running frequency of the oscillator will be $F_0$.

If for some reason the frequency of the synchronization signal $F_p$ departs from the frequency of the oscillator wave $F_z$, then there appears at the output of the phase detector 2 a control voltage $V_4$ which, according to the fact that the synchronization frequency is higher or lower than the generator frequency, is lower or higher than $V_{k3}$. For example, if $F_p<F_z$, then $V_4>V_{k3}$ and $V_4-V_{k3}$ may be represented as a positive voltage $+V_r$ shown in FIG. 2b. The capacitor 5 will now be able to become discharged to this voltage. The curve 13 shown in FIG. 2b represents this discharge and it is seen that at the instant $t_1$, which is determined by the intersection of the curve 13 and the sinusoidal voltage curve, the grid voltage is again driven positive with respect to the cathode voltage. This means that grid current will flow only from $t_1$ to T, hence the phase difference will become $-\varphi_1$, whence it follows that the generator frequency will assume a different value, since the angle $-\varphi'_0$, according to the phase characteristic shown in FIG. 3, is associated with the frequency $F_0$, and the phase variation involves of necessity a frequency variation so that a smaller phase difference results. The control voltage $+V_r$ will then slightly decrease until, with a phase angle $-\varphi'_1$, equilibrium is restored so that $F_p=F_z$.

If $F_p>F_z$, then $V_4-V_{k3}$ is driven negative, for example $-V_r$, to which condition the discharge curve 14 refers (FIG. 2b), which intersects the sine curve at $t_2$ to produce a phase difference $-\varphi_2$. This phase variation results in trimming the frequency so that $F_p=F_z$. This state of equilibrium is associated with the phase angle $-\varphi'_2$ (FIG. 3).

In all these cases, the resulting anode current has the same form as $i_{g1}$ shown in FIG. 2a. This current produces in the anode circuit a voltage 16 as shown in FIG. 1. The voltage 16 may then serve, if desired, for controlling an output stage providing for the line deflection in a television receiver and from which output a comparison voltage 17 is moreover derived, which is fed back to the phase detector 2.

As stated before, this circuit arrangement has the advantage that in the case of voltage variations at 4, other than due to departure of the oscillator frequency from the synchronization frequency, the voltage $V_4=V_{k3}$ persists. As a result, no frequency variations will occur, since even if the amplitude of $e_{g1}$ varies, due to such voltage variations, the intersection remains at $t_0$. Neither will space charge variations occur since the grid potential remains equal to the cathode potential.

Figure 4:
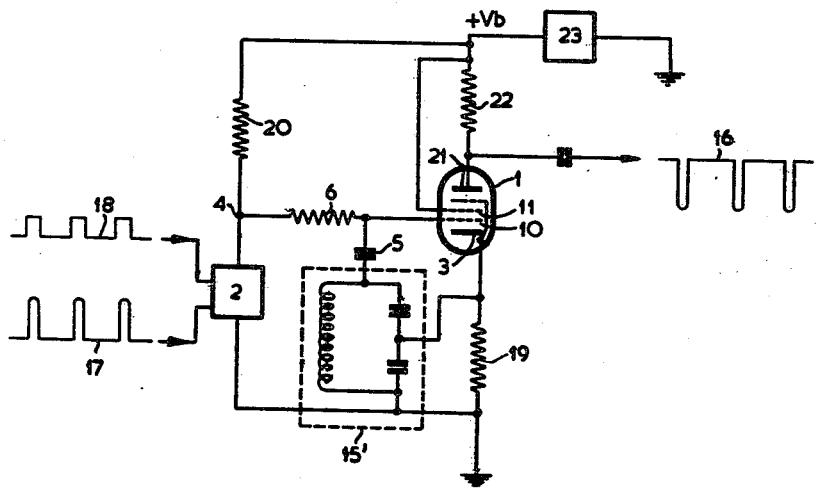
FIG. 4 is a schematic circuit diagram of another form of electric wave oscillator.

FIG. 4 shows a further form of the circuit arrangement, corresponding parts bearing the same reference numerals as in FIG. 1. This circuit operates similarly but uses capacitative voltage division in the self-inductance-capacitance circuit 15' which is also substantially tuned to the line frequency.

It is to be noted that the pulsatory voltage can easily be transformed into a saw-tooth voltage by inserting an integrating network in the anode lead of the valve 1.

What is claimed is:

1. A controllable oscillator comprising an electron discharge device having a cathode, at least one control electrode, and an output electrode, an inductance-capacitance circuit resonant at a given frequency, capacitor means interconnecting said inductance capacitance circuit and said control electrode, a source of variable direct voltage, resistor means interconnecting said control electrode and said source, and positive feedback circuit means interconnecting said discharge device and inductance capacitance circuit in regenerative feedback relationship, the time constant of said resistor means and capacitor being short with respect to the period of said given frequency.

2. A controllable oscillator comprising an electron discharge device having a cathode, at least one control electrode, and an output electrode, a parallel inductance capacitance circuit resonant at a given frequency, capacitor means interconnecting said inductance capacitance circuit and said control electrode, serially connected circuit means interconnecting said control electrode and cathode comprising a source of direct voltage and a resistor having one end connected to said control electrode, positive feedback circuit means interconnecting said discharge device and inductance capacitance circuit in regenerative feedback relationship, and an output circuit connected to said output electrode, the time constant of said resistor and capacitor means being short in relationship to the period of natural oscillation of said resonant circuit.

3. A controllable oscillator comprising an electron discharge device having a cathode, at least one control electrode, and an output electrode, a parallel inductance capacitance circuit resonant at a given frequency, capacitor means interconnecting said inductance capacitance circuit and said control electrode, phase detecting circuit means providing a direct output voltage variable in response to deviation between the frequency of oscillation of said oscillator and the frequency of an externally derived synchronization signal, resistor means, circuit means serially connecting the output of said phase detecting circuit means and said resistor means between said control electrode and said cathode, positive feedback circuit means interconnecting said discharge device and said inductance capacitance circuit in regenerative feedback relationship, and an output circuit connected to said output electrode, the time constant of said resistor means and capacitor means being short in relationship to the period of natural oscillation of said resonant circuit.

4. A controllable oscillator comprising an electron discharge device having, in the order named, a cathode, first and second control electrodes, and an output electrode, an inductance capacitance circuit resonant at a given frequency interconnecting said first and second control electrodes in regenerative feedback relationship, a blocking circuit comprising a capacitor and resistor, said capacitor being connected between said first control electrode and one terminal of said inductance capacitance circuit, a source of variable direct voltage, said resistor being connected between said first control electrode and one terminal of said source, circuit means connecting the other terminal of said source and said cathode, and output circuit means connected to said output electrode, the time constant of said blocking circuit being short with respect to the period of said given frequency.

5. A controllable oscillator comprising an electron discharge device having, in the order named, a cathode, first and second control electrodes, and an output electrode, an inductance capacitance circuit resonant at a given frequency interconnecting said first and second control electrodes in regenerative feedback relationship, a blocking circuit comprising a capacitor and resistor, said capacitor being connected between said first control electrode and one terminal of said inductance capacitance circuit, phase detecting circuit means providing a direct output voltage varaible in response to deviation between the frequency of oscillation of said oscillator and the frequency of an externally derived synchronization signal, one end of said resistor being connected to said first control electrode, circuit means connecting the output of said phase detecting circuit means serially between the other end of said resistor and said cathode, and output circuit means connected to said output electrode, the time constant of said blocking circuit being short with respect to the period of said given frequency.

6. The oscillator of claim 5, in which a tap on said inductance capacitance circuit is connected to said cathode, and said circuit means connecting the output of the phase detecting circuit means between the other end of said resistor and said cathode comprises another resistor connected between said tap and another terminal of said inductance capacitance circuit.

7. The oscillator of claim 5, in which a voltage-dependent resistor is connected between said other end of said blocking circuit resistor and a source of direct voltage.

8. A controllable oscillator comprising an electron discharge device having at least a cathode, a control grid, and an anode, a parallel resonant inductance-capacitance circuit, first capacitor means connecting one end of said resonant circuit to said control grid, second capacitor means connecting the other end of said resonant circuit to a point of reference potential, positive feedback circuit means connecting said discharge device to said resonant circuit in regenerative feedback relationship comprising means connecting said cathode to a tap on said resonant circuit, and first resistor means and a source of variable control potential connected serially between said control grid and point of reference potential, the time constant of said first capacitor means and first resistor means being short with respect to the resonant frequency of said resonant circuit.

9. The oscillator of claim 8, comprising a source of direct voltage having a first terminal connected to said point of reference potential, and a second terminal, and voltage dependent resistor means connected between said second terminal and the junction of said second resistor means and source of variable potential.

10. A controllable oscillator comprising an electron discharge device having at least a cathode, a control grid, and an anode, a parallel resonant inductance-capacitance circuit, a source of operating potential having first and second terminals, means connecting said anode to said first terminal, first resistance means connecting said cathode to said second terminal, first capacitor means connecting one end of said resonant circuit to said control grid, second capacitor means connecting the other end of said resonant circuit to said second terminal, means connecting said cathode to a tap on said resonant circuit, and second resistor means and a source of variable direct voltage connected serially between said control grid and said second terminal, the time constant of said second resistor means and first capacitor being short with respect to the resonant frequency of said resonant circuit.

References Cited in the file of this patent
UNITED STATES PATENTS

| | | |
|---|---|---|
| 2,671,173 | Gamertsfelder | Mar. 2, 1954 |
| 2,672,510 | Enslein | Mar. 16, 1954 |
| 2,681,992 | Haughton | June 22, 1954 |
| 2,740,046 | Tellier | Mar. 27, 1956 |
| 2,760,071 | Janssen | Apr. 21, 1956 |
| 2,800,047 | Hanert | July 23, 1957 |
| 2,851,632 | Janssen et al. | Sept. 9, 1958 |
| 2,928,306 | Hanert et al. | Mar. 15, 1960 |
| 2,952,811 | Carr | Sept. 13, 1960 |

OTHER REFERENCES

Fleming: Electronics, pages 216–224, March 1955.